United States Patent [19]

Peetz et al.

[11] Patent Number: 4,538,855
[45] Date of Patent: Sep. 3, 1985

[54] ADJUSTING ARRANGEMENT FOR SEAT, PARTICULARLY POWER VEHICLE SEAT

[75] Inventors: Walter Peetz, Hackenheim; Hans Wilking, Rothselberg; Egon Kafitz, Hochspeyer, all of Fed. Rep. of Germany

[73] Assignee: Keiper Recaro GmbH & Co., Remscheid, Fed. Rep. of Germany

[21] Appl. No.: 504,842

[22] Filed: Jun. 17, 1983

[30] Foreign Application Priority Data

Jun. 18, 1982 [DE] Fed. Rep. of Germany ....... 3222758

[51] Int. Cl.³ .................. A47C 1/025; F16H 55/18
[52] U.S. Cl. .................................. 297/362; 74/570; 74/804
[58] Field of Search ................. 297/362, 355; 74/570, 74/571, 804, 805

[56] References Cited

U.S. PATENT DOCUMENTS

| 825,428 | 7/1906 | Spencer | 74/570 |
| 1,054,883 | 3/1913 | Vale | 74/570 |
| 4,227,741 | 10/1980 | Gross et al. | 297/362 |
| 4,321,207 | 2/1983 | Wilking et al. | 297/362 |
| 4,470,633 | 8/1984 | Fourvey et al. | 297/362 |

FOREIGN PATENT DOCUMENTS

| 2326223 | 12/1974 | Fed. Rep. of Germany | 297/362 |
| 2641583 | 3/1978 | Fed. Rep. of Germany | 297/362 |

Primary Examiner—William E. Lyddane
Assistant Examiner—Mark W. Binder
Attorney, Agent, or Firm—Michael J. Striker

[57] ABSTRACT

An adjusting arrangement for inclination adjustment of a backrest of a seat has two hinges adjustably connecting the backrest with a seat part at each side and having first and second hinge levers associated with the backrest and the seat part and connected with one another by a pivot axle, and a displacing and fixing device determining the position of the hinge lever relative to one another and formed as a wobble drive including an eccentric associated with the pivot axle and retained in a force-transmitting abutment on the pivot axle, wherein the pivot axle is formed as a continuous shaft which connects the hinges with one another and has end portions supporting the hinge levers, the shaft having a recess provided in each of the end portions and receiving the eccentric, and each hinge lever surrounding the eccentric received in the recess.

8 Claims, 5 Drawing Figures

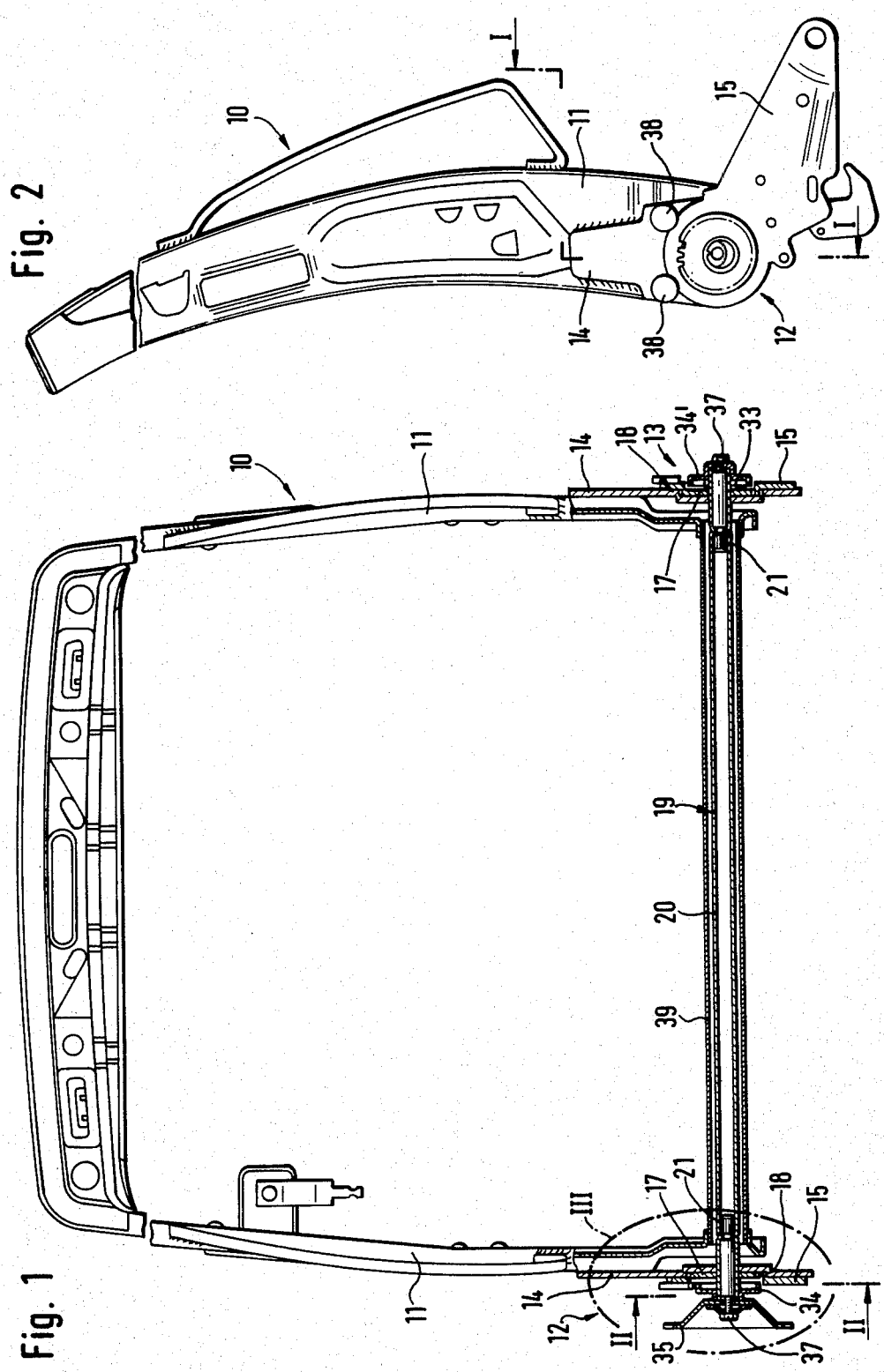

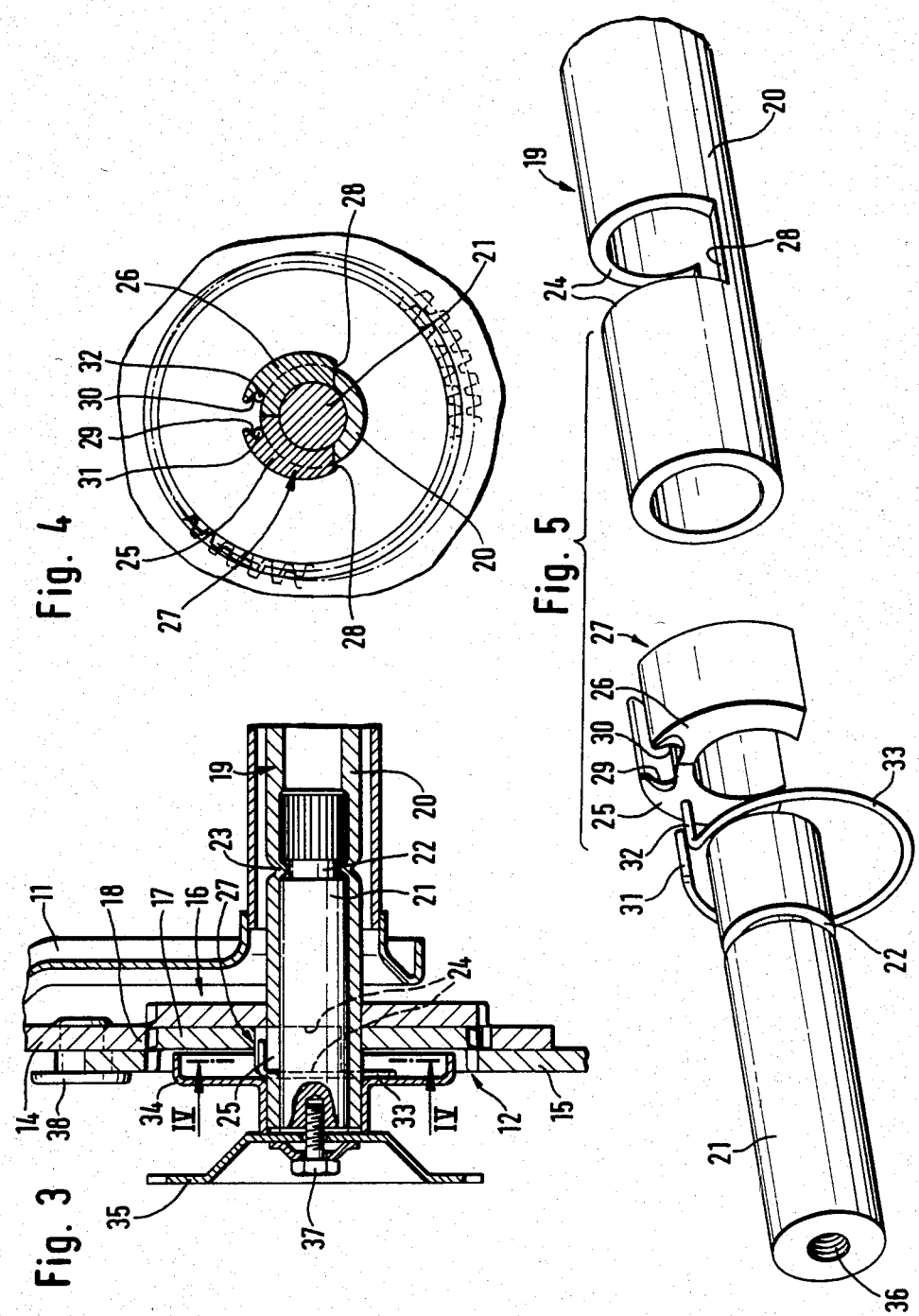

ADJUSTING ARRANGEMENT FOR SEAT, PARTICULARLY POWER VEHICLE SEAT

BACKGROUND OF THE INVENTION

The present invention relates to an adjusting arrangement for a seat, particularly a power vehicle seat, for inclination adjustment of a backrest.

Arrangements of the above mentioned general type are known in the art. In a known arrangement, the backrest is connected with a seat part by hinges provided at both sides, and each hinge has a hinge part associated with the backrest and a hinge part associated with the seat part and connected with one another via a pivot axle. The arrangement is also provided with displacing and fixing means which determine the position of the hinge levers relative to one another and is formed as a wobble drive including an eccentric associated with the pivot axle and composed of two wedge segments which are held by a pressure accumulator in a force-transmitting abutment on the pivot axle. Such an arrangement is disclosed, for example, in the German Offenlegungsschrift No. 3,013,304. This arrangement is formed of two hinges each arranged at each seat longitudinal side between the seat part and the backrest. Each hinge has a pivot axle by which both hinge levers of each hinge are connected with one another. One hinge lever, for example the hinge lever connected with the backrest, is supported on a centric portion of the pivot axle, whereas the other hinge lever, for example the hinge lever connected with the seat part, is supported on an eccentric. The outer toothing of the eccentric engages in the inner toothing of the first mentioned hinge part and forms with the same a so-called wobble drive. The eccentric is composed of a cam disk which is connected for joint rotation with the pivot axle and has two cam projections offset from one another, and also includes two wedge segments arranged between the cam projections and spread from one another by a pressure accumulator. The wedge segments are pressed on the cam disk, on the one hand, and, on the other hand, pressed on the inner opening of the hinge part surrounding the eccentric. Because of the wedge segments which are spreadable from one another, the toothing, on the one hand, and the bearing points, on the other hand, are prestressed in a play-free manner relative to one another. When the rotation of the pivot axle is actuated via a cam projection of the respective neighboring wedge segment in releasing direction, a play which facilitates the displacing movement is generated. Both pivot axles of the hinges arranged at both seat longitudinal sides are connected with one another in a known manner by transmission rods which engage in non-round openings of each pivot axle. Because of the play at the connecting points between the transmission rods and the pivot axles of each hinge in connection with the elasticity of the transmission rod itself and also because not exact coincidence of the eccentric's highest points of both hinges, an intermittent movement takes place during adjustment of the backrest inclination, particularly in the hinge in which the adjusting movement is transmitted through the transmission rod. This intermittent movement is identified by experts as judder movement. Such a judder movement causes, particularly in addition to a uneven movement course, also noise during the adjusting movement. Special difficulties take place in such backrests in which the frame, because its construction is relatively rigid.

SUMMARY OF THE INVENTION

Accordingly, it is an object of the present invention to provide an adjusting arrangement for a seat, which avoids the disadvantages of the prior art.

More particularly, it is an object of the present invention to provide an adjusting arrangement for a backrest of a seat which eliminates the so-called judder problem.

In keeping with these objects and with others which will become apparent hereinafter, one feature of the present invention resides, briefly stated, in an adjusting arrangement, in which the pivot axle is formed by a continuous shaft which connects both hinges with one another and has end portions on which the hinge levers are supported, wherein each hinge lever surrounds the wedge segments received in a recess on both end portions of the shaft.

The continuous shaft which forms an integral pivot axle for both hinges eliminates the manufacturing play on the connecting points, inasmuch as with the integral shaft such connecting points do not take place and, on the other hand, the recesses can exactly coincide in their height position in the end portions of the shaft, so that the highest point of the eccentric of both hinges exactly coincide with one another. The remaining disadvantage of the springing of the transmission rods can be avoided by the respective dimensioning of the shaft. Thereby the judder problem of the backrest adjustment is solved, and a synchronous adjusting movement is provided.

In accordance with another feature of the present invention, the shaft is formed as a pipe with recesses in its end regions and pins pressed into its end regions, so that the pins together with the recesses form a recessed space for the wedge segments of the eccentric. This simplifies the manufacture, on the one hand, and provides an economical material consumption, on the other hand.

The wedge segments can be advantageously spread to their abutment position by a pressure accumulator which is formed as a ring spring surrounding the shaft. The ring spring can have bent pressure springs which engage in holding notches of the wedge segments.

For continuously maintaining the spreading action of the springs, the ring spring in accordance with a further feature of the present invention is secured in its position by a cup disk fixed on the shaft end.

For maintaining the pins in their axial position in the pipe, the pins can be provided advantageously with an annular groove, and the wall of the pipe is pressed into the annular grooves so as to form a restriction.

On mounting grounds, it is advantageous when the hinge lever connected with the backrest is supported directly on the shaft, whereas the hinge lever associated with the seat part surrounds the wedge segments which form the eccentric.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a view showing an adjusting arrangement for a backrest of a seat, which includes two hinges in connection with a backrest frame, in a section taken along the line I—I in FIG. 2;

FIG. 2 is a side view showing the backrest frame having the hinge in a section taken along the line II—II in FIG. 1;

FIG. 3 is a view showing a fragment 3 in FIG. 1 and illustrating the hinge arranged at the handwheel side of the shaft, on an enlarged scale;

FIG. 4 is a view showing a shaft which connects both hinges, in a cross section taken along the line 4—4 in FIG. 3 at the eccentric location; and FIG. 5 is an exploded perspective view of the shaft end of FIG. 3.

DESCRIPTION OF THE PREFERRED EMBODIMENT

A backrest is identified with reference numeral 10 and has frame arms 11 fixedly connected with hinges 12 and 13. Each hinge substantially includes a turnable hinge lever 14 which is fixedly connected with the frame arm 11 of the backrest, a hinge lever 15 which is fixedly connected with a not shown seat part, and an adjusting device 16.

The adjusting device includes a spur gear 17 which is for example formed by punching from the hinge lever 15 and has an outer toothing. The outer toothing of the spur gear 17 engages with an inner toothing of a gear rim 18 which is for example also formed by punching from the turnable hinge part 14. The diameter of the head circle of the spur gear 17 is smaller than the diameter of the foot circle of the inner toothing of the gear rim 18 by at least one tooth height. Correspondingly, the toothings have numbers of teeth which differ from one another by at least one tooth, wherein the number of teeth of the gear rim 18 is greater than the number of teeth of the spur gear 17. Thus, the arrangement of the adjusting device is selected so that with each hinge the hinge lever 14 connected with the backrest can roll with its inner toothing on the outer toothing of the spur gear 17 of the hinge lever 15.

The hinge lever 14 provided in each hinge and having the gear rim 18 with the inner toothing is rotatably supported on both hinges with a shaft 19 extending through their end regions. The shaft 19 substantially includes a pipe 20 with a pin 21 pressed into its end region. For reliably fixing the pin 21, particularly in an axial direction, in the respective pipe end, the pin is provided with an annular groove 22 arranged at a distance from its end face which is flush with the pipe end. A wall of the pipe 20 is pressed into the annular groove 22 so as to form a constriction 23.

The pipe 20 is provided in its each end region with a cut-out 24 of the same shape and dimension and located at a small distance from the outer end of the shaft 19. The pipe wall developement of each cut-out 24 corresponds to a rectangle. The cut-out 24 forms, together with the pin 21 inserted in the pipe 20, a recess which extends over a circumferential region and is provided at each end of the shaft 19. Wedge segments 25 and 26 engage in these recesses and together with a portion of the pipe 20 and the inwardly located pin 21 complete a circular cross section which forms an eccentric 27 on the shaft 19. The eccentricity of each eccentric corresponds to half the difference between the foot circle of the gear rim 18 and the head circle of the spur gear 17. The spur gear 17 of the hinge lever 15 is supported on the respective eccentric.

Since the wedge segments 25 and 26 surround more than 200° of the pin 21 arranged in the pipe 20, the segment which forms the substantial part of the eccentric 27 is subdivided on mounting grounds into two wedge segments 25 and 26. For absorbing manufacturing tolerances, on the one hand, and providing a reliable abutment of the wedge segment on a cam faces 28 of the pipe 20, on the other hand, the wedge segments 25 and 26 are provided in the region of its separating joint with a holding notch 29 and 30. Pressing fingers 31 and 32 of a ring spring 33 which acts as a force accumulator engage in the holding notches 29 and 30. The ring spring 33 is secured by cup disks 34 and 34'. The cup disks are held in axial position at a seat side having the handle by a cam plate 35 provided for a not shown handwheel and screwed within the pin 21.

At the opposite seat longitudinal side having the hinge 13, the cup disk 34' overlaps the end surface of the shaft 19 and is directly fixed on the shaft 19 via a screw 37 which is screwed into a threaded hole 36 of the pin 21. Thereby also the ring spring 33 of the hinge 13 is secure in its position in axial direction. The axial arrangement of the mutually turnable hinge levers 14 and 15 of each hinge 12 or 13 is carried out in a known manner by a head pin 38 which is for example riveted in the hinge lever 14 and overlaps with the edge region of its head the other hinge lever 15.

As can be seen particularly from FIGS. 1 and 3, the shaft 19 can be coated with a frame pipe 39 which connects the frame arms 11 of the backrest 10 with one another. This frame pipe 39 provides in the hinge region of the backrest 10 a stable backrest frame.

When the cam plate 35 of the not shown handwheel, which is connected for joint rotation with the shaft 19, imparts rotary movement to the shaft 19, the eccentric 27 rolls in the opening of the spur gear 17 associated with the hinge lever 15, so that the shaft performs an eccentric rotary movement by a value of the eccentricity. This wobble movement is transferred also to the hinge lever 14 or its gear rim 18, whose inner toothing rolls on the outer toothing of the spur gear 17. Thereby the engagement point between the gear rim 18 and the spur gear 17 also rolls over during the rotation of the shaft 19 by one revolution. During this one revolution, the hinge lever 14 is rotated by one tooth pitch. Since both eccentrics 27 for both hinges 12 and 13 are arranged on the same shaft 19, a synchronous rotary movement of both hinges takes place.

Various modifications of the above described construction are possible. For example, it is possible to provide instead of the eccentric 27 formed by two wedge segments, a one-piece eccentric segment that has at most a circumference of 180° and can be fitted from one side onto the pin 21 in the pipe 20. In this case the annular spring 33 can be dispensed with. Moreover, it is also possible to form the shaft 19 of one piece and to provide the recess 24, for example by copying milling and the like, in the shaft 19.

It will be understood that each of the elements described above, or two or more together, may also find a useful application in other types of constructions differing from the types described above.

While the invention has been illustrated and described as embodied in an adjusting arrangement for inclination adjustment of a backrest of a seat, particularly a power vehicle seat, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adjusting arrangement for inclination adjustment of a backrest of a seat, particularly a power vehicle seat, comprising
    two hinges arranged to adjustably connect a backrest with a seat part of the seat at each side of the latter, each of said hinges having a first hinge lever associated with the backrest and a second hinge lever associated with the seat part and connected with one another by a pivot axle; and
    displacing and fixing means arranged to determine a position of said hinge levers relative to one another and formed as a wobble drive, said means having an eccentric associated with said pivot axle and retained in a force-transmitting abutment on said pivot axle, said eccentric being composed of two wedge-shaped cylindrical segments, and a spring element supporting said wedge-shaped cylindrical segments on said pivot axle in a force-transmitting abutment, for spreading apart said wedge-shaped cylindrical segments, said pivot axle being formed by a single one-piece continuous shaft which connects said hinges with one another and has end portions which directly pivotally support one of said hinge levers of each pair of said hinge levers, said shaft having a recess provided in each of said end portions and receiving said wedge-shaped cylindrical segments, and the other of said hinge levers of each pair of said hinge levers surrounding said wedge-shaped cylindrical segments received in said recess.

2. An adjusting arrangement as defined in claim 1; and further comprising a pressure accumulator arranged to retain said wedge segments of said eccentric in a force-transmitting abutment on said pivot axle.

3. An adjusting arrangement as defined on claim 1, wherein said shaft is formed by a pipe provided in said end portions with said recesses and having a pin pressed into each of said end portions, each of said recesses of said pipe forming together with the respective pin a recessed space for said wedge segments which forms said eccentric.

4. An adjusting arrangement as defined in claim 1; and further comprising a pressure accumulator which spreads said wedge segments to their abutment position and is formed as a ring spring engaging said shaft, said wedge segments having holding notches, and said ring spring having pressure fingers engageable into said pressure notches.

5. An adjusting arrangement as defined in claim 4; and further comprising a cup disk which is fixed on said shaft and arranged to secure the position of said ring spring.

6. An adjusting arrangement as defined in claim 3, wherein each of said pins has an annular groove, said pipe having a constriction which is engaged into said annular groove of the respective pin.

7. An adjusting arrangement as defined in claim 1, wherein each hinge lever connected with the backrest is directly supported on said shaft, each hinge lever associated with the seat part embracing said eccentric.

8. An adjusting arrangement as defined in claim 1, wherein each hinge lever connected with the backrest is directly supported on said shaft, each hinge lever associated with the seat part embracing said wedge segments which form said eccentric.

* * * * *